US006865973B1

(12) United States Patent
Hasegawa (10) Patent No.: US 6,865,973 B1
(45) Date of Patent: Mar. 15, 2005

(54) METHOD AND APPARATUS FOR FEEDING WORKPIECE

(75) Inventor: Takayoshi Hasegawa, Kanagawa (JP)

(73) Assignee: Amada Company, Limited (JP)

( * ) Notice: Subject to any disclaimer, the term of this patent is extended or adjusted under 35 U.S.C. 154(b) by 0 days.

(21) Appl. No.: 08/828,940

(22) Filed: Mar. 28, 1997

(30) Foreign Application Priority Data

Mar. 29, 1996 (JP) .............................................. 8-076761

(51) Int. Cl.$^7$ ........................... B23D 55/04; B26D 7/06
(52) U.S. Cl. ............................ 83/13; 83/76.8; 83/76.9; 83/365; 83/367; 83/435.2; 83/436.1; 198/463.3; 198/572; 198/576
(58) Field of Search ............................. 83/35, 36, 404, 83/404.1, 425, 425.2, 364, 365, 367, 54, 435.2, 732, 76.8, 76.9; 144/242.1, 245.1, 250.23, 357; 198/463.3, 476.1, 572, 576

(56) References Cited

U.S. PATENT DOCUMENTS

| | | | | |
|---|---|---|---|---|
| 3,779,117 A | * | 12/1973 | Roberson et al. ...... 83/425.2 X |
| 3,811,487 A | * | 5/1974 | Warren et al. ............... 144/357 |
| 3,875,841 A | * | 4/1975 | Noble et al. ........... 83/425.2 X |
| 4,269,245 A | * | 5/1981 | Fornell et al. ............ 83/367 X |
| 4,383,561 A | * | 5/1983 | Gregoire et al. ......... 144/357 X |
| 4,413,662 A | * | 11/1983 | Gregoire et al. .......... 83/367 X |
| 4,445,411 A | * | 5/1984 | Purcell .................. 83/425.2 X |
| 4,515,196 A | * | 5/1985 | Shields ...................... 83/367 X |
| 4,665,786 A | * | 5/1987 | Shields ...................... 83/367 X |
| 4,811,776 A | * | 3/1989 | Bolton et al. ................ 144/357 |
| 4,867,213 A | * | 9/1989 | Bolton et al. ................ 144/357 |
| 4,949,769 A | * | 8/1990 | Cameron ................ 144/357 X |
| 5,086,678 A | | 2/1992 | Aoyagi et al. |
| 5,368,080 A | * | 11/1994 | Hamel ......................... 144/357 |
| 5,441,092 A | * | 8/1995 | Randle .................. 83/425.2 X |
| 5,544,558 A | * | 8/1996 | Hughes ................... 83/367 X |
| 5,655,667 A | * | 8/1997 | Isaacs .................... 198/572 X |
| 6,219,585 B1 | * | 4/2001 | Hughes et al. .......... 144/357 X |

FOREIGN PATENT DOCUMENTS

JP           6-715       *  1/1994    ................ 83/435.2

* cited by examiner

*Primary Examiner*—Clark F. Dexter
(74) *Attorney, Agent, or Firm*—Blank Rome LLP (57) ABSTRACT

A workpiece conveying and feeding unit for conveying a long workpiece in the lengthwise direction to feed the workpiece to a cutting machine is disposed in the rear of the cutting machine. A workpiece conveying unit conveys the workpiece in the lengthwise direction of the workpiece into a workpiece conveying passage of the workpiece conveying and feeding unit. When a plurality of workpieces placed on the workpiece conveying unit are sequentially conveyed to the workpiece conveying passage of the workpiece conveying and feeding unit to convey the workpieces to the cutting machine, the side surface of the workpiece which is conveyed to the workpiece conveying passage of the workpiece conveying and feeding unit by the workpiece conveying unit is detected by a side-surface detector. In accordance with the conveyance distance calculated in accordance with the diameter of the workpiece, the side surface of which has been detected, and the positional relationship between the workpiece conveying passage and the side-surface detector, the workpiece is located on the workpiece conveying passage.

4 Claims, 12 Drawing Sheets

METHOD AND APPARATUS FOR FEEDING WORKPIECE

BACKGROUND OF THE INVENTION

1. Field of the Invention

The present invention relates to a method and an apparatus for feeding workpieces, such as long round bars or pipes, to an arbitrary cutting machine, such as a band saw machine or a disc cutter, and more particularly to a feeding method and a feeding apparatus for a workpiece conveying and feeding apparatus for conveying and feeding a workpiece to a cutting machine such that the workpiece can accurately be located to a predetermined position in a workpiece conveying and feeding passage.

2. Description of the Related Art

Hitherto, a method has been employed in which a workpiece conveying and feeding unit for conveying a workpiece, such as a long round rod or a pipe, in the lengthwise direction to convey the workpiece to an arbitrary cutting machine, such as a band saw machine or disc cutter. The unit is disposed in the rear of the cutting machine. A workpiece conveying unit for conveying the workpiece in a direction perpendicular to the lengthwise direction of the workpiece to convey the workpiece to a workpiece conveying passage of the workpiece conveying and feeding unit is provided. Either of the workpiece conveying and feeding unit or the workpiece conveying unit is made to be capable of vertically moving. A plurality of workpieces placed on a plurality of conveying chains provided for the workpiece conveying unit are sequentially conveyed to the workpiece conveying passage of the workpiece conveying and feeding unit. The workpieces conveyed to the workpiece conveying passage are sequentially conveyed to the cutting machine.

More specifically, a structure disclosed in, for example, U.S. Pat. No. 5,086,678 is formed such that a conveyance passage of a workpiece conveying and feeding unit has a plurality of rotative cylindrical rollers. The outer shape of the roller is formed into straight in the lengthwise direction. A workpiece conveying unit for conveying a workpiece W onto the roller has a structure having a plurality of endless conveying chains, in the lengthwise direction of the workpiece conveying passage, extending in a direction of the radius (in the lateral direction) of the workpiece W perpendicular to the lengthwise direction (in the longitudinal direction) of the workpiece conveying passage.

When a plurality of workpieces W placed on the conveying chains are, one by one, placed on the roller, the overall body of the workpiece conveying passage is moved downwards. Then, the workpiece W is conveyed onto the roller which has been moved downwards by driving the conveying chain. Therefore, the workpiece W is brought into contact with a standing roller which is retractable with respect to the upper portion of the conveying chain so as to be located. Then, the overall body of the workpiece conveying passage is moved upwards so that the roller supports the workpiece W.

Since the foregoing conventional structure sometimes encounters a fact that a plurality of workpieces W are conveyed onto the roller if the plurality of the workpieces W having different diameters are placed on the conveying chain and then conveyed onto the roller, the position of the overall body of the workpiece conveying passage can be adjusted in the lateral direction to correspond to the diameter of the workpiece W. Therefore, there arise a problem in that the structure cannot be simplified. Since the structure is employed in which the workpiece W is brought into contact with the standing roller so as to be located, difference in the diameter of the workpieces W results in the axial position of the workpiece W being deviated in the lateral direction. For example, a structure of the cutting machine formed such that a disc cutter, such as a disc saw or a disc cutter, is provided to be capable of vertically moving sometimes encounters deviation of the axial position of the workpiece with respect to the cutting direction of the disc cutter. Therefore, there arises a problem in that the lower end movement position of the cutter must be controlled to be adaptable to the diameter of the workpiece.

Moreover, the above-mentioned conventional structure cannot locate the workpiece W to the connection portion between chain links of the conveying chain when workpieces W having various diameters are placed on the conveying chain. Therefore, there arises a problem in that the space of the apparatus cannot effectively be used.

SUMMARY OF THE INVENTION

In view of the foregoing, an object of the present invention is to provide a method and an apparatus for feeding workpieces capable of, one by one, feeding workpieces to a roller of a workpiece conveying and feeding unit with a simple structure.

Another object of the present invention is to provide a workpiece feeding method and apparatus formed such that the axial position of the workpiece is not deviated in the lateral direction even if the workpieces have different diameters so that the axial position of the workpiece is not deviated with respect to the cutting direction of the disc shape cutter so as to eliminate the necessity of performing control of the lowermost position of the cutter to be adaptable to the diameter of the workpiece.

Still another object of the present invention is to provide a workpiece feeding method and apparatus formed such that the axial position of the workpiece is not deviated in the lateral direction even if the workpieces have different diameters so that the axial position of the workpiece is always supplied to a predetermined position between two sawtooth guides so as to enable the cutting work to be performed stably.

A further object of the present invention is to provide a workpiece feeding method and apparatus capable of placing and locating workpieces W having various diameters even on connection portions between chain links of a conveying chain when the workpieces are placed on the conveying chain so that a large number of workpieces are placed and conveyed even with the same conveying chain and thus the space is effectively used.

In order to achieve the foregoing objects, according to a first aspect of the present invention, there is provided a method of feeding a workpiece comprising the steps of: causing a workpiece conveying and feeding unit to feed a long workpiece in a lengthwise direction to a cutting machine; causing a workpiece conveying unit to convey the workpiece in a direction perpendicular to the lengthwise direction of the workpiece so as to convey the workpiece into the workpiece conveying passage of the workpiece conveying and feeding unit; relatively vertically moving either the workpiece conveying and feeding unit or the workpiece conveying unit which are capable of relatively vertically moving; sequentially conveying plural workpieces placed on the workpiece conveying unit into the workpiece conveying passage of the workpiece conveying and feeding unit to sequentially feed the workpieces to the cutting machine; causing a side-surface detection means to detect the side surface of the workpiece which is conveyed to the workpiece conveying passage of the workpiece conveying and feeding unit by the workpiece conveying unit; and locating the workpiece onto the workpiece conveying passage according to the distance calculated in accordance with the diameter of the workpiece, the side surface of the workpiece detected by the side-surface detection means and the positional relationship between the workpiece conveying passage and the side-surface detection means.

In the construction above, even if the workpieces to be conveyed to the workpiece conveying passage have different diameters, the workpieces can accurately be located one by one to a predetermined position on the workpiece conveying passage. That is, a plurality of workpieces are not simultaneously conveyed to the workpiece conveying passage. Thus, the workpieces can reliably be fed one by one to the cutting machine.

According to a second aspect of the present invention as it depends from the first aspect, a workpiece conveying and feeding unit disposed in the rear of a cutting machine and structured to feed a long workpiece in the lengthwise direction to feed the workpiece to the cutting machine; and a workpiece conveying unit for conveying the workpiece in a direction perpendicular to the lengthwise-directional of the workpiece to a workpiece conveying passage of the workpiece conveying and feeding unit; wherein, either of the workpiece conveying and feeding unit or the workpiece conveying unit is made to be capable of vertically moving; the workpiece conveying and feeding unit has a plurality of conveying chains disposed in parallel to support a plurality of the workpieces; V-shape recesses for supporting the workpieces are formed in the lengthwise-directional central portion of a chain link of each of the conveying chains; and V-shape recesses for supporting the workpieces are formed between adjacent chain links of the conveying chain.

The workpiece can be placed even on the connection portion between chain links as well as on the chain links of the conveying chain. Therefore, a larger number of workpieces can be placed on the conveying chain.

According to a third aspect of the present invention as it depends from the second aspect, the workpiece conveying passage of the workpiece conveying and feeding unit has a plurality of conveying rollers each having a V-shape peripheral groove on the outer surface thereof, and the length of the conveying roller is shorter than the length of the chain link of the conveying chain provided for the workpiece conveying unit.

Even if workpieces are placed on the central portion of the chain link of the conveying chain and the connection portion between the chain links, only one workpiece can be supported by the conveying roller.

According to a fourth aspect of the present invention as it depends from the third aspect, a workpiece support members having substantially the same length as that of the chain link are provided for the workpiece conveying and feeding unit at a position in the workpiece conveying passage near the conveying roller, an interference preventive recess is formed in the central portion of the workpiece support member to prevent interference with the workpiece placed on the conveying roller, and inclined surfaces for separating adjacent workpieces and workpiece support recesses for supporting the separated workpieces are formed on the two sides of the interference preventive recess.

If a plurality of workpieces are in contact with each other and placed on the chain link of the conveying chain, workpieces positioned on the two sides of a central workpiece are slightly separated from the central workpiece. Thus, the workpieces can reliably be conveyed by the conveying roller.

According to a fifth aspect of the present invention as it depends from the second, third or forth aspect, a side-surface detection means for detecting the side surface of the workpiece which is conveyed by the workpiece conveying unit to the workpiece conveying passage is provided for the workpiece conveying and feeding unit.

Thus, the side surface of a workpiece which is conveyed to the workpiece conveying passage can be detected. By using the detected position as a reference, the conveyance distance of the workpiece can be controlled. Thus, the workpiece can accurately be located to a predetermined position in the workpiece conveying passage. Therefore, only one workpiece can be conveyed and located in the workpiece conveying passage.

According to a sixth aspect of the present invention as it depends from the fifth aspect, the side-surface detection means has a light emitter and a light receiver, the light emitter and the light receiver are diagonally disposed opposite to each other on a vertical plane, and the lower optical element is disposed on the lower surface of a bracket disposed diagonally.

Thus, a dropped object from the workpiece or the like is caused to be dropped on the upper surface of the bracket. Therefore, the optical element can be protected by the bracket.

According to a seventh aspect of the present invention, there is provided a workpiece feeding apparatus comprising:

a workpiece conveying and feeding unit disposed in the rear of a cutting machine and structured to feed a long workpiece in the lengthwise direction to the cutting machine; a workpiece conveying unit for conveying the workpiece in a direction perpendicular to the lengthwise-direction of the workpiece to a workpiece conveying passage of the workpiece conveying and feeding unit, the workpiece conveying unit being able to relatively vertically move with respect to the workpiece conveying and feeding unit; a control unit for controlling operations of the workpiece conveying and feeding unit and the workpiece conveying unit; input means for inputting the diameters of the workpieces and the placement order of a plurality of workpieces to be placed on a conveying chain provided for the workpiece conveying unit to a memory of the control unit; side-surface detection means for detecting the side surface of the workpiece on the conveying chain when the conveying chain is driven; and conveyance distance calculating portion for calculating the conveyance distance for locating the workpiece to the workpiece conveying passage in accordance with the placement order of the workpieces, the diameters of the workpieces and the offset distance between the workpiece conveying passage and the side-surface detection means stored in the memory when the side surface of the workpiece has been detected by the side-surface detection means; wherein, the control unit controls drive of the conveying chain in accordance with a result of the calculation performed by the conveyance distance calculating portion.

Thus, a plurality of workpieces placed on the conveying chain can sequentially be placed one by one onto the workpiece conveying passage to be conveyed to the cutting machine. Therefore, the apparatus can be automated.

DESCRIPTION OF THE PREFERRED EMBODIMENTS

Figure 1:
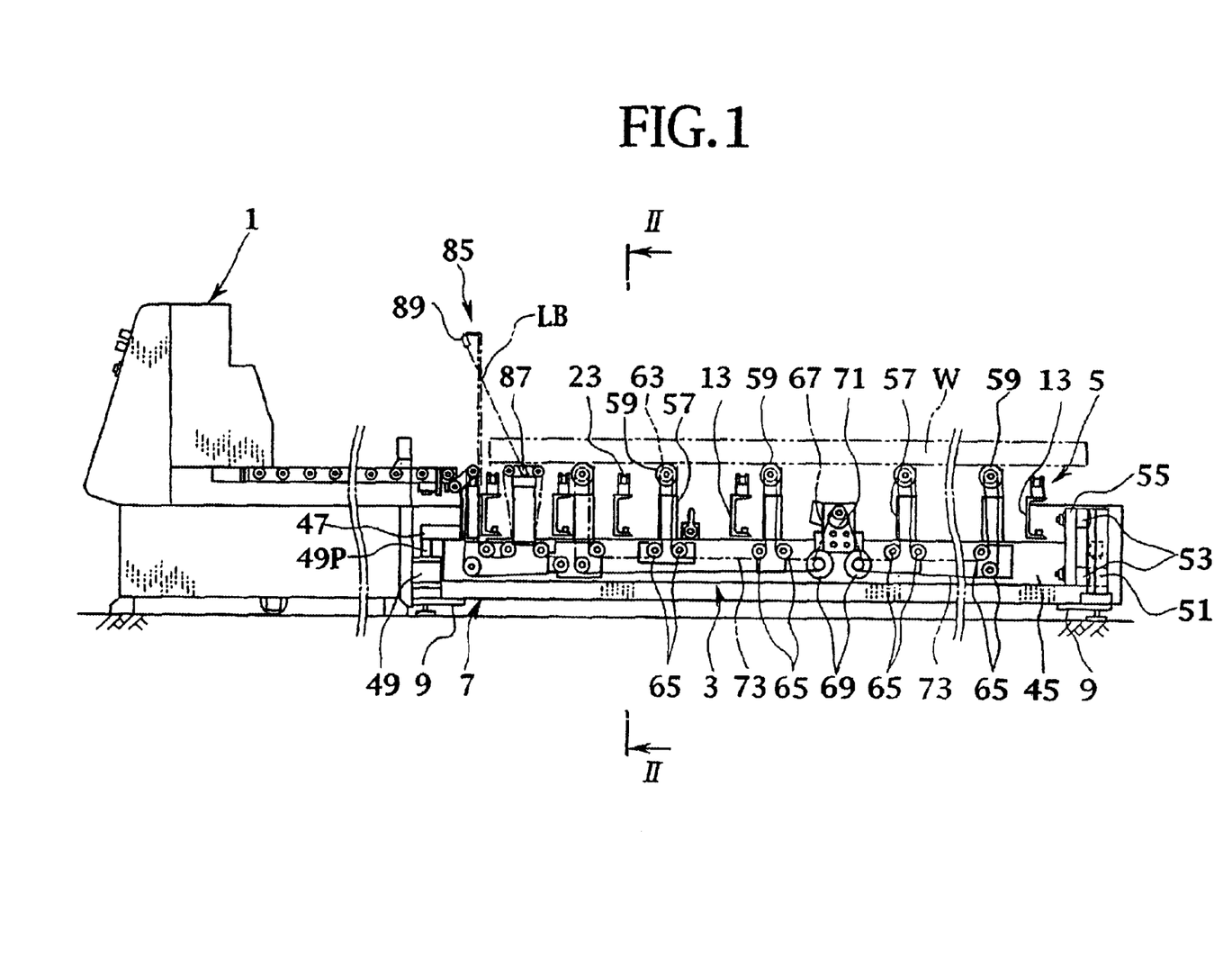
FIG. 1 is a side view showing a workpiece feeding apparatus according to the present invention and adapted to a cutting machine.
Figure 2:
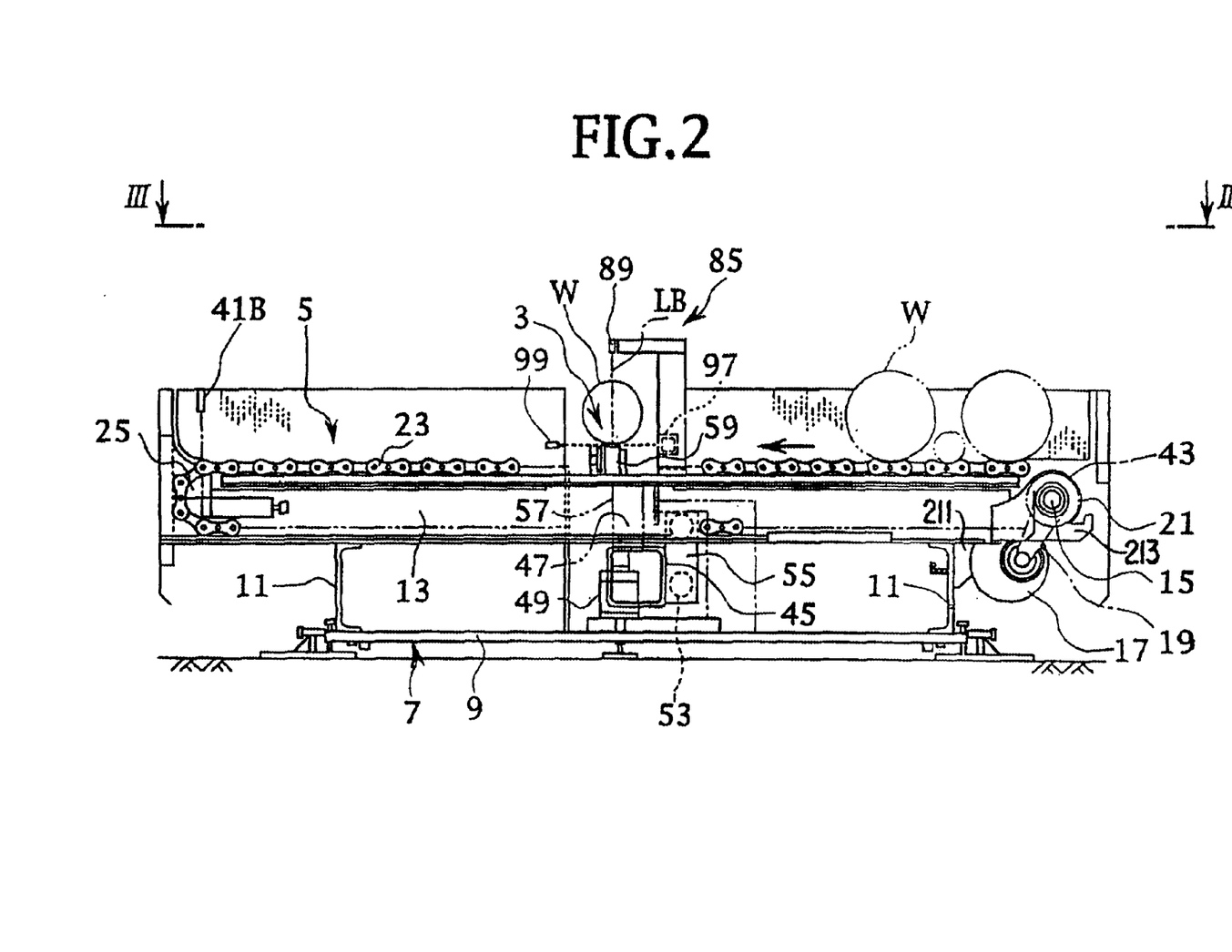
FIG. 2 is a cross sectional view taken along line II—II shown in FIG. 1.
Figure 3:
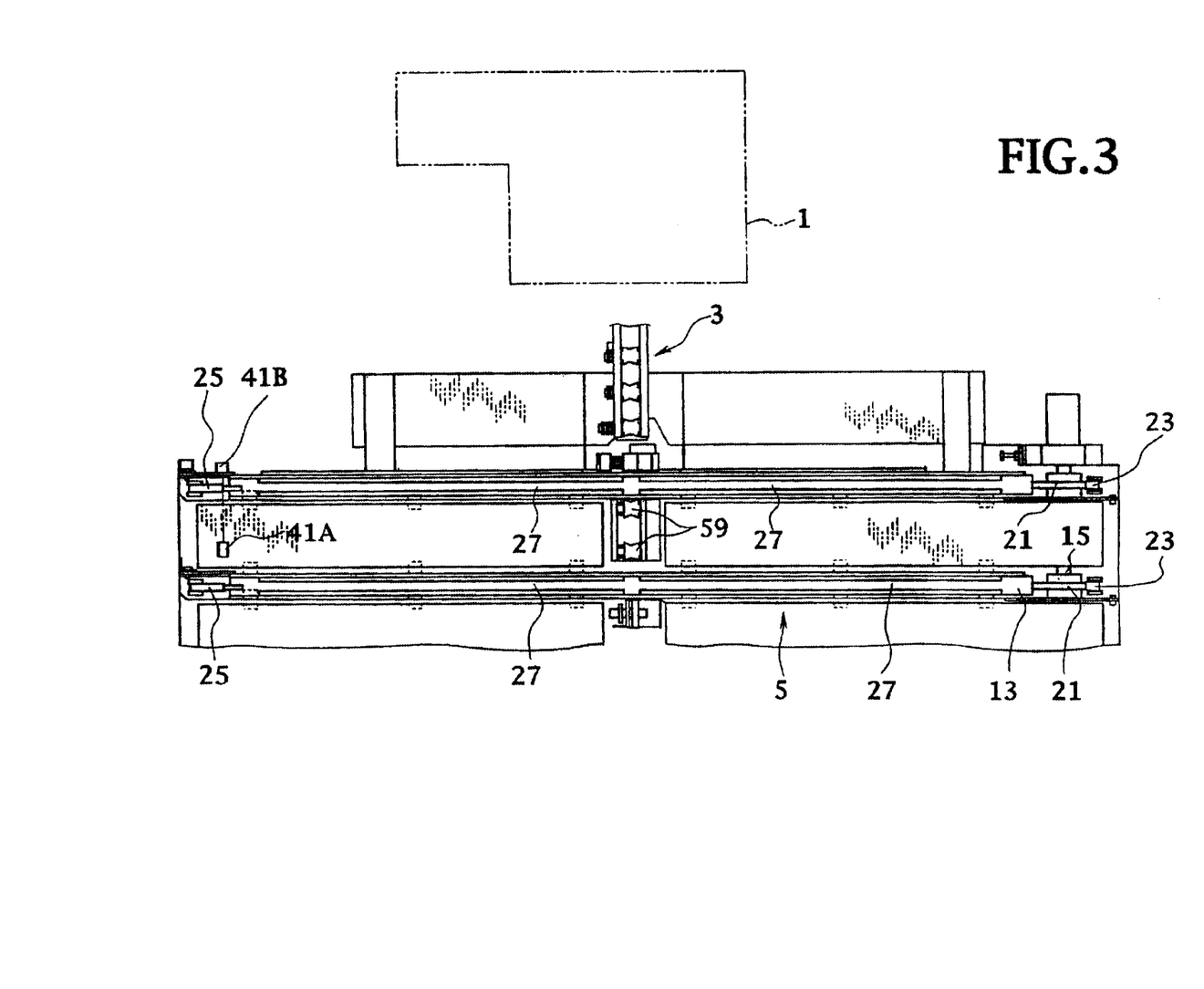
FIG. 3 is a plan view taken along line III—III shown in FIG. 2.

Referring to FIGS. 1, 2 and 3, a workpiece conveying and feeding unit 3 for conveying a workpiece W, such as a long round bar or a pipe, in the lengthwise direction to feed the same to an arbitrary cutting machine 1, for example, a band saw, a disc saw or disc cutter, is disposed in the rear (in the right-hand portion of FIG. 1) of the cutting machine 1. Moreover, a workpiece conveying unit 5 for conveying the workpiece W to the workpiece conveying and feeding unit 3 is disposed.

The cutting machine 1 having a known general structure is omitted from description.

A frame 7 for supporting the workpiece conveying and feeding unit 3 and the workpiece conveying unit 5 is disposed in the rear of the cutting machine 1. The frame 7, as shown in FIG. 2, has a pair of right and left channel members 11, the front and rear ends of which are secured to front and rear base plates 9 each having an adjust bolt and so forth for vertical adjustment of the channel members 11. A plurality of chain support members 13 extending in the lateral direction and made of a channel member are disposed on the channel members 11, the chain support members 13 being disposed apart from each other in the front and rear direction (in the lateral direction in FIG. 1). A bracket 211 connects one channel member 11 and the support member 13.

A bracket 213 is integrally attached to an end of each of the chain support members 13. The bracket 213 rotatively supports a rotational shaft 15 extending in the front and rear direction (in the vertical direction with respect to the paper sheet on which FIG. 2 is drawn). The rotational shaft 15 is, through an arbitrary power transmission mechanism 19, such as a chain, linked and connected to a conveying motor 17 mounted on the frame 7. Moreover, a plurality of sprockets 21 corresponding to the chain support members 13 are attached to the rotational shaft 15.

Figure 4:
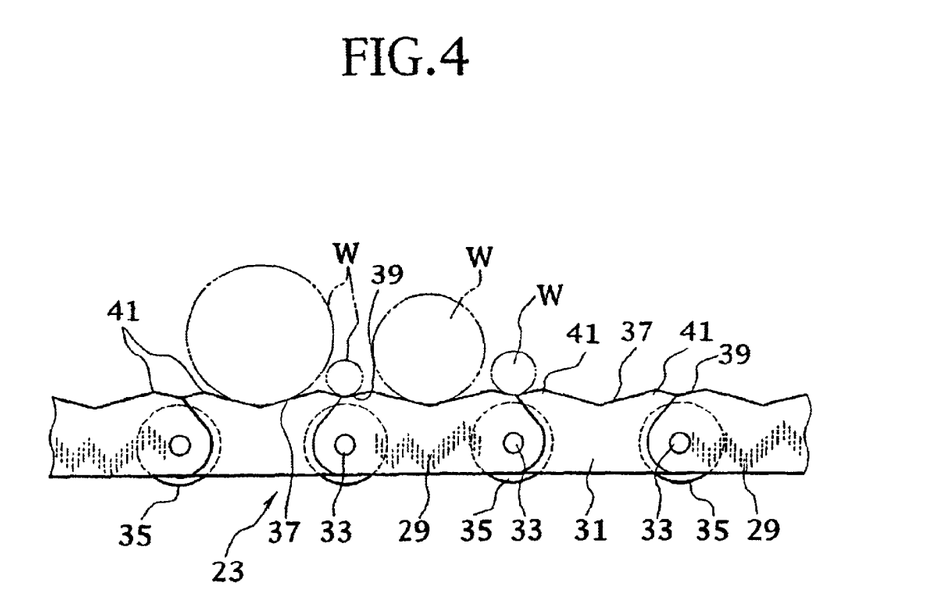
FIG. 4 is a diagram showing a chain link of a conveying chain.

An endless conveying chain 23 is wound around each of the sprockets 21. The conveying chain 23 extends in the lateral direction to pass through the position of the workpiece conveying and feeding unit 3. The conveying chain 23 is guided by a chain guide 27 provided for another end of each of the chain support members 13 and having a semicircular arc shape and is guided by the chain guide 27 (see FIG. 3) formed in the lateral direction to prevent zigzag movement. Moreover, the conveying chain 23 is, as shown in FIG. 4, formed by connecting a pair of outer chain links 29 and a pair of inner chain links 31 with connecting pins 33. A roller 35 is rotatively provided for each connecting pin 33.

Recesses 37 each of which is formed in a V-shape and has a large size for supporting the workpieces W are formed in the central portions of each of the chain links 29 and 31 in the lengthwise direction. V-shape recesses 39 for supporting workpieces W each having a small diameter are formed between the adjacent chain links 29 and 31.

More specifically, each of the chain links 29 and 31 is formed into a shape having a triangular projection 41, the size of which is slightly smaller than the distance between the connecting pins 33. The large recess 37 is formed between the projections 41. The small recess 39 is formed between the projections 41 of the adjacent chain links 29 and 31. The distances among the recesses 37 and 39 are made to be the same.

As can be understood from the description above, the conveying chain 23 has the large recesses 37 for supporting the workpieces W in the central portion in the lengthwise direction of the chain links 29 and 31. Moreover, the small recesses 39 are formed among the chain links 29 and 31. Therefore, workpieces W having various diameters are mounted on the conveying chain 23 such that workpieces W each having a small diameter can be mounted among workpieces W each having a large diameter. Therefore, the region of the conveying chain 23 for mounting the workpieces W can effectively be used. Thus, a multiplicity of workpieces can be mounted.

When the conveying motor 17 is rotated to drive the conveying chain 23 in the right and left lateral direction, the workpieces W on the conveying chain 23 can be conveyed in the lateral direction so that the workpiece W is conveyed to the workpiece conveying and feeding unit 3. The conveying chain 23 is, as shown in FIG. 2, disposed to have the same lengths in the lateral direction with respect to the workpiece conveying and feeding unit 3. A workpiece detection means for detecting whether or not the workpiece W is mounted on the conveying chain 23 is provided at the rear end (adjacent to the chain guide 25) of the conveying chain 23. The workpiece detection means according to this embodiment comprises a light emitter 41A and a light receiver 41B (see FIG. 3).

In order to detect the distance for which the conveying chain 23 is conveyed, the foregoing structure comprises a rotary encoder 43 provided for the rotational shaft 15, the rotary encoder 43 being arbitrarily linked and connected thereto. If a structure is employed in which the rotary encoder is provided for the conveying motor 17 to detect the rotational position of the conveying motor 17, the rotary encoder 43 may be omitted from the structure.

As shown in FIG. 1, the workpiece conveying and feeding unit 3 has an elevation base 45 disposed below the chain support members 13 of the workpiece conveying unit 5, the elevation base 45 being formed to extend in the longitudinal direction (in the lateral direction in FIG. 1) and having a square pipe shape. A bracket 47 (only front one is shown in FIG. 1) is horizontally disposed at each of the front and rear ends of the elevation base 45. Each bracket 47 is supported by a piston rod 49P provided for the front and rear elevation cylinder 49 attached to the front and rear base plates 9, the piston rod 49P being structured to be capable of moving vertically.

Moreover, a roller bracket 55 having a plurality of guide rollers 53 capable of vertically moving along vertical guide members 51 (only the rear end one is shown in FIG. 1) stood erect from the front and rear base plates 9 is attached to each of the front and rear ends of the elevation base 45.

A plurality of support rods 57 disposed apart from one another in the longitudinal direction are stood erect over the upper surface of the elevation base 45. A conveying roller 59 for supporting the workpiece W to convey and feed the same to the cutting machine 1 is, through a shaft 61 (see FIG. 5), rotatively supported in the upper portion of each of the support rods 57. The plural conveying rollers 59 form a workpiece W conveying and feeding passage for conveying and feeding the workpiece W to the cutting machine 1.

In order to rotate each conveying roller 59, a sprocket 63 is integrally attached to each conveying roller 59. Moreover, as shown in FIG. 1, a plurality of sprockets 65 are provided for the elevation base 45 at positions near the lower portion of each of the support rods 57.

The elevation base 45 is provided with a conveying motor 71 for rotating the drive sprocket 69 through an arbitrary power transmission mechanism 67, such as a belt or a chain. In order to cause the conveying roller 59 to be rotated by the conveying motor 71, a chain 73 is wound in an arbitrary fashion around the drive sprocket 69 and each of the sprockets 63 and 65.

Therefore, when the conveying motor 71 is rotated, the plural conveying rollers 59 are synchronously rotated in the same direction through the chain 73. Thus, the workpieces W on the conveying roller 59 can be conveyed to the cutting machine 1. When the conveying motor 71 is rotated reversely, the residual members can be returned.

In order to support and convey the workpiece W, which has been conveyed in the lateral direction by the conveying chain 23 of the workpiece conveying unit 5 and thus located at a position above the conveying roller 59, to the cutting machine 1, the elevation cylinder 49 is operated to upwards move the elevation base 45. As a result, the conveying roller 59 is moved to upwardly project over the conveying chain 23 as indicated by an imaginary line shown in FIG. 5 so that the workpiece W on the conveying chain 23 is pushed upwards and then supported.

Figure 5:
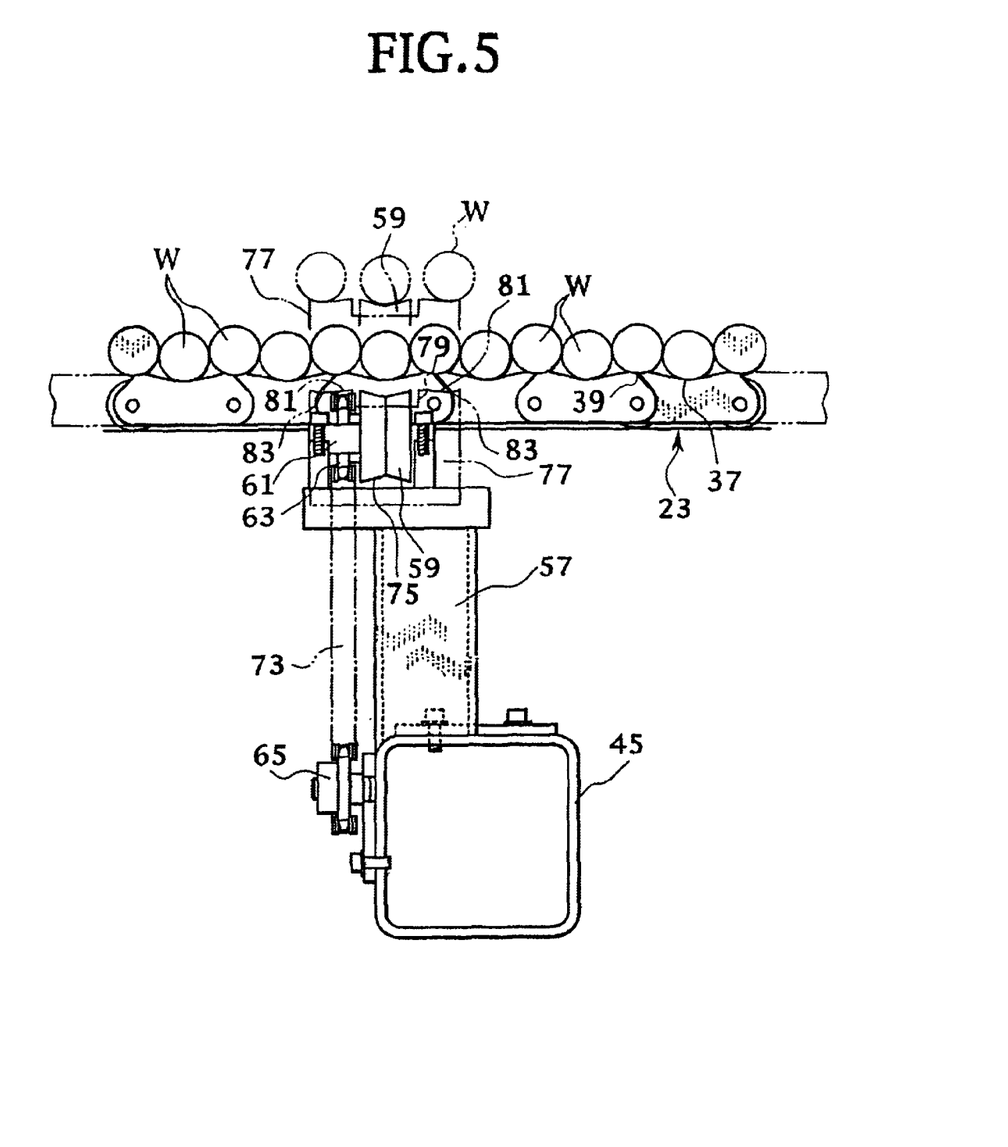
FIG. 5 is a diagram showing the operation relationship between a conveying roller and a workpiece support member.

When the elevation cylinder 49 is operated to downwardly move the elevation base 45, the conveying roller 59 is subsided from the upper portion of the conveying chain 23 (as indicated by a continuous line shown in FIG. 5). Therefore, the workpiece W supported by the conveying roller 59 can be placed on the conveying chain 23.

As shown in FIG. 5, the conveying roller 59 is formed into a shape having, on the outer surface thereof, a V-shape peripheral groove 75 for supporting the workpiece W. The lateral length (the axial directional length) of the conveying roller 59 is shorter than each of the chain links 29 and 31, the length being determined, for example, to be about ⅓ of the chain links 29 and 31.

The support rods 57 are provided with a workpiece support member 77 at a position adjacent to the conveying roller 59, the workpiece support member 77 having substantially the same length as that of the chain links 29 and 31 of the conveying chain 23. In a case where workpieces W are placed in parallel in the recess 37 in the central portion of the conveying chain 23 and the recesses 39 among the adjacent chain links 29 and 31 and the three workpieces W are simultaneously moved upwards, the workpiece support member 77 slightly separates the right and left workpieces W from the central workpiece W.

Therefore, the workpiece support member 77 has, in the central portion thereof, a recess 79 for preventing interference with the workpiece W supported by the conveying roller 59. Further, the workpiece support number 77 has, in the right and left symmetrical positions thereof, inclined surfaces 81 for separating the two side workpieces W from the central workpiece W, the inclined surfaces 81 being formed symmetrically in the lateral direction. Moreover, the workpiece support member 77 is provided with a recess 83 for supporting the separated workpieces W, the recess 83 being formed symmetrically in the lateral direction (the shape of the upper portion of the workpiece support member 77 is indicated by an imaginary line).

The lateral-directional length of the recess 83 for supporting the workpiece is made to be slightly longer than the lateral-directional length of the recess 39 formed between the chain links 29 and 31.

Therefore, when the elevation base 45 has been moved upwards by the conveying roller 59 to support the workpiece W in a state where the workpieces W are in parallel supported in the recesses 37 and 39 of the chain links 29 and 31, the three workpieces W are moved upwards by the conveying roller 59 and the workpiece support member 77. Thus, the right and left workpieces W are slightly separated from the central workpiece W supported by the conveying roller 59 along the inclined surface 81 so as to be supported by the recess 83 for supporting the workpiece.

In this connection, even if the adjacent workpieces W are placed in contact with one another on the conveying chain 23, the state of contact with the adjacent workpieces W can be suspended when the conveying roller 59 supports the workpieces W to convey the same to the cutting machine 1. Therefore, a larger number of workpieces W can be placed on the conveying chain 23.

When the elevation base 45 has been moved downwards, the workpieces W respectively supported by the conveying roller 59 and the recess 83 of the workpiece support member 77 are again placed and supported by the original recesses 37 and 39 of the conveying chain 23.

When the conveying chain 23 of the workpiece conveying unit 5 is driven to bring the workpiece W on the conveying chain 23 to a position above the conveying roller 59 in a state where the workpiece conveying passage of the workpiece conveying and feeding unit 3 has been moved downwards, the side surface of the workpiece W which is conveyed into the workpiece conveying passage is detected by a side-surface detection means 85.

Figure 6:
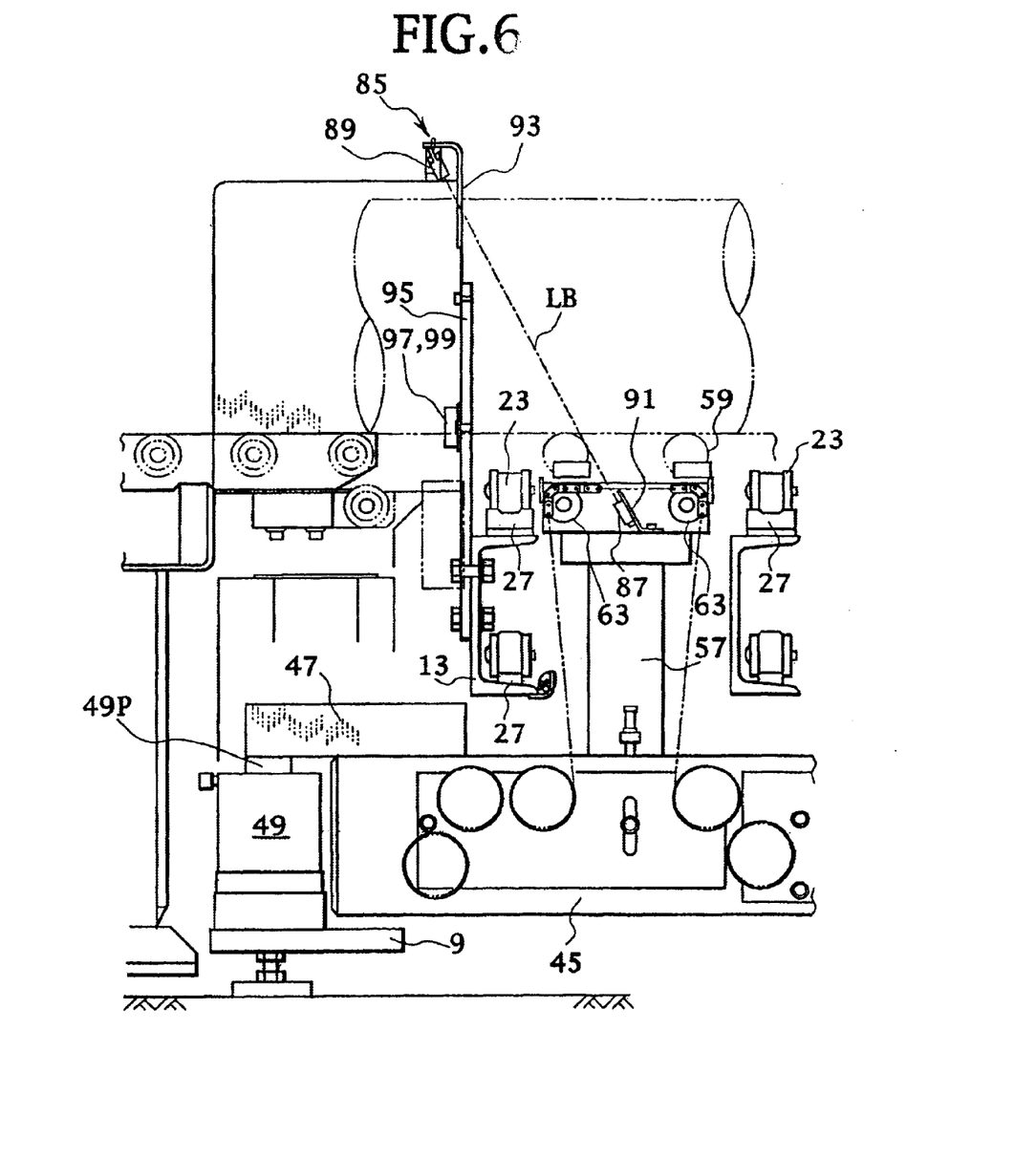
FIG. 6 is an enlarged view showing an essential portion shown in FIG. 1.

The side-surface detection means 85 according to this embodiment, as shown in FIG. 6, comprises, a light emitter 87 and a light receiver 89.

The light emitter 87 is attached to the lower surface of a bracket 91 diagonally attached to the upper portion of the support rods 57 at a position lower than the position of the conveying roller 59, the light emitter 87 being attached more inside than the leading end of the bracket 91. Therefore, the light emitter 87 can be protected by the bracket 91 from an object falling from the workpiece W.

Figure 7:
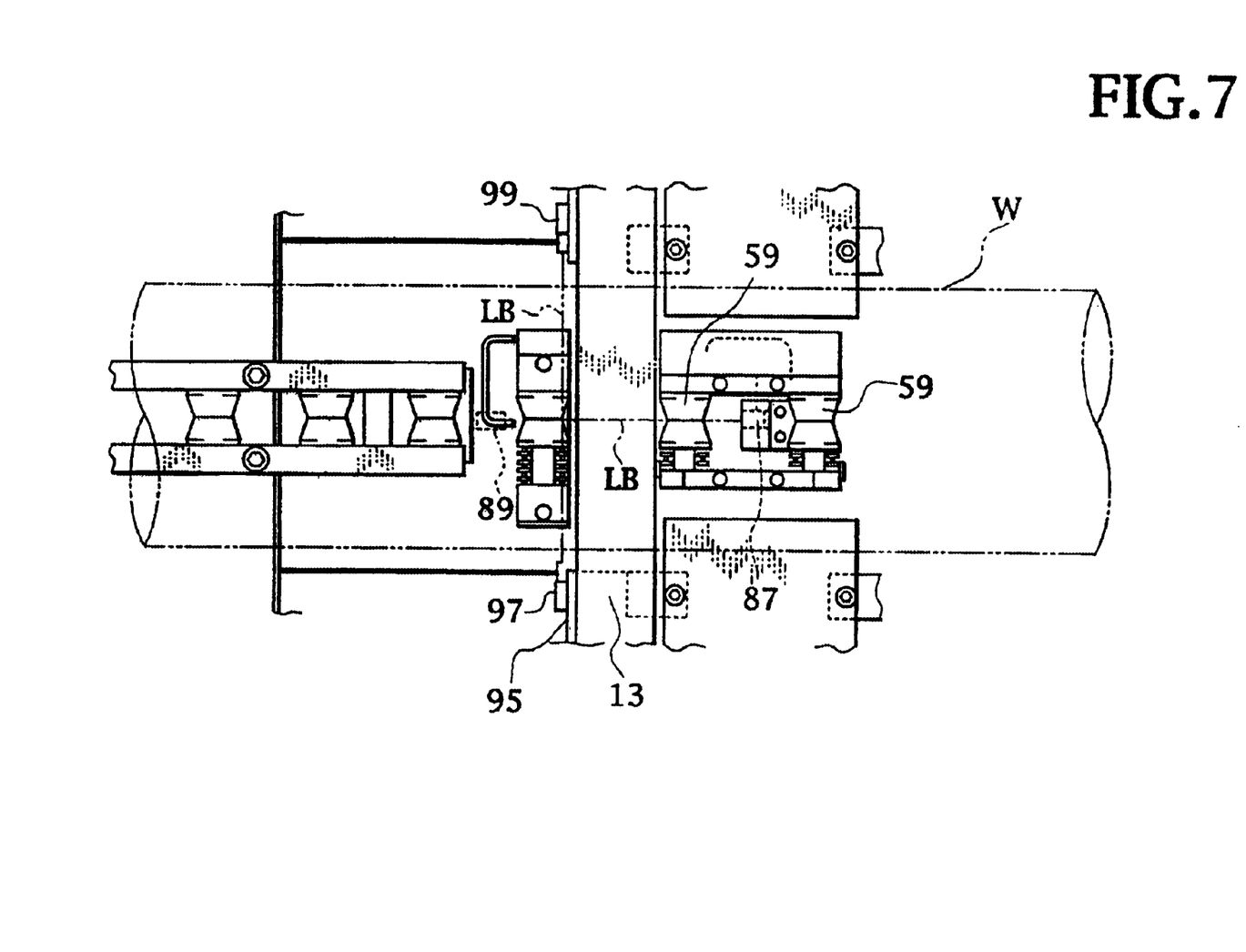
FIG. 7 is a plan view of FIG. 6 when viewed from an upper position.
Figure 8:
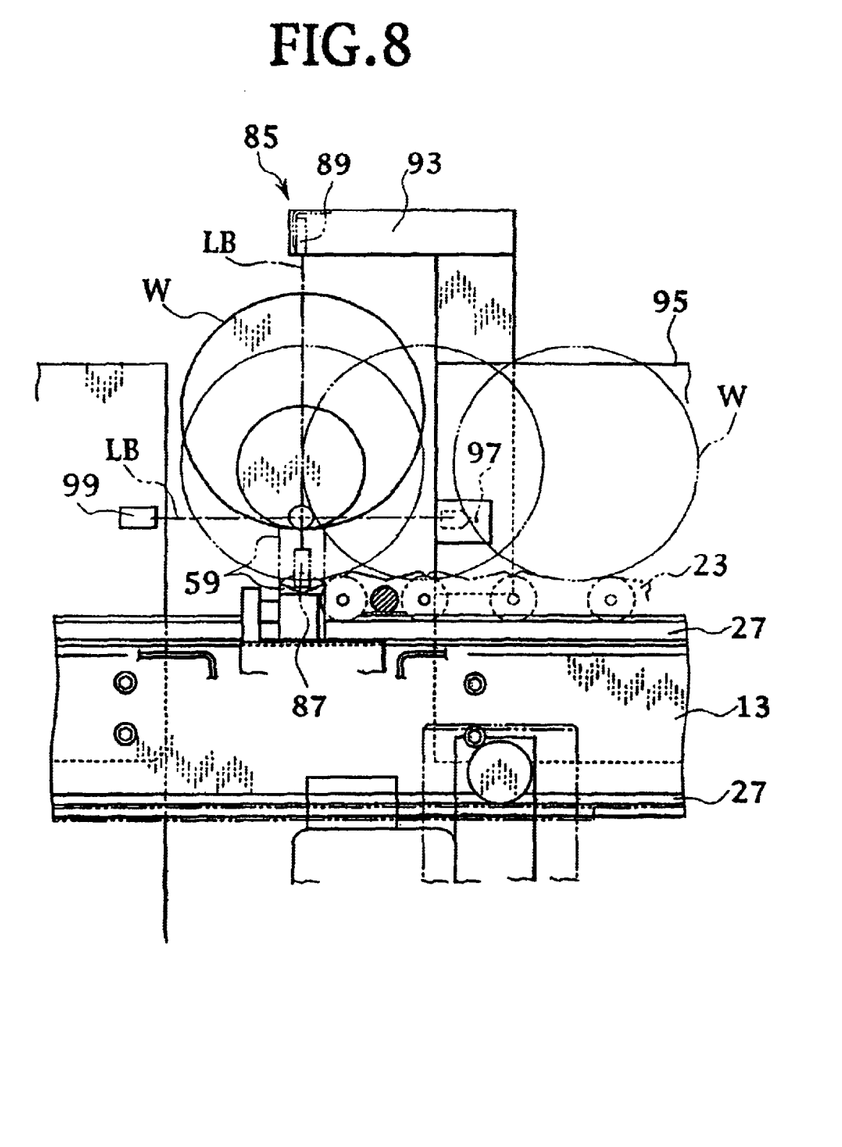
FIG. 8 is an enlarged view showing the essential portion shown in FIG. 2.

The light receiver 89 is attached to an L-shape bracket 93 supported by a plate 95 secured to the chain support member 13 nearest the cutting machine 1. Thus, the light receiver 89 is able to receive light beam LB diagonally emitted from the light emitter 87. In order to detect the side surface of the workpiece W in the lengthwise direction at the central position of the conveying roller 59 in the lengthwise direction the light emitter 87 and the light receiver 89 are, as shown in FIG. 7, disposed on a vertical plane including the central portion of the conveying roller 59 in the lengthwise direction. That is, the offset distance from the conveyance determining position for the workpiece W is made to be zero. Note the vertical positions of the light emitter 87 and the light receiver 89 may be reversed.

As a result of the above-mentioned structure, when the workpiece W is conveyed to a position above the conveying roller 59 by the conveying chain 23, the workpiece W interrupts the light beam LB so that the lengthwise-directional side surface of the workpiece W can be detected. Therefore, the side surface of the workpiece W is detected, and then the workpiece W is further conveyed for a distance corresponding to the radius of the workpiece W. As a result, the workpiece W can accurately be located to a position above the conveying roller 59.

If the light emitter 87 and the light receiver 89 are set off toward the portion for conveying the workpiece W by the conveying chain 23, the workpiece W is required to be further conveyed for a distance corresponding to the sum of the offset distance and the radius of the workpiece W. Therefore, the positions of the light emitter 87 and the light receiver 89 are permitted to be displaced from the lengthwise-directional center of the conveying roller 59.

Moreover, the plate 95, to which the bracket 93 is attached, has a light emitter 97 and a light receiver 99 serving as end detection means for detecting the end of the residual portion of the workpiece W obtained when the workpiece W has been fed to the cutting machine 1 and the residual portion of the workpiece W is returned, the light emitter 97 and the light receiver 99 being disposed opposite to each other in the horizontal direction.

Therefore, when the conveying roller 59 is rotated reversely to return the residual portion, the conveying roller 59 is rotated reversely for a predetermined time set to, for example, a timer, from detection of suspension of shielding of the light beam LB from the base plate 9 by the end of the residual portion. Thus, the end of the residual portion can be brought to a predetermined position. Then, the elevation base 45 is moved downwards so that the conveying roller 59 is moved downwards from the conveying chain 23 so that the residual portion supported by the conveying roller 59 is placed on the conveying chain 23.

Figure 9:
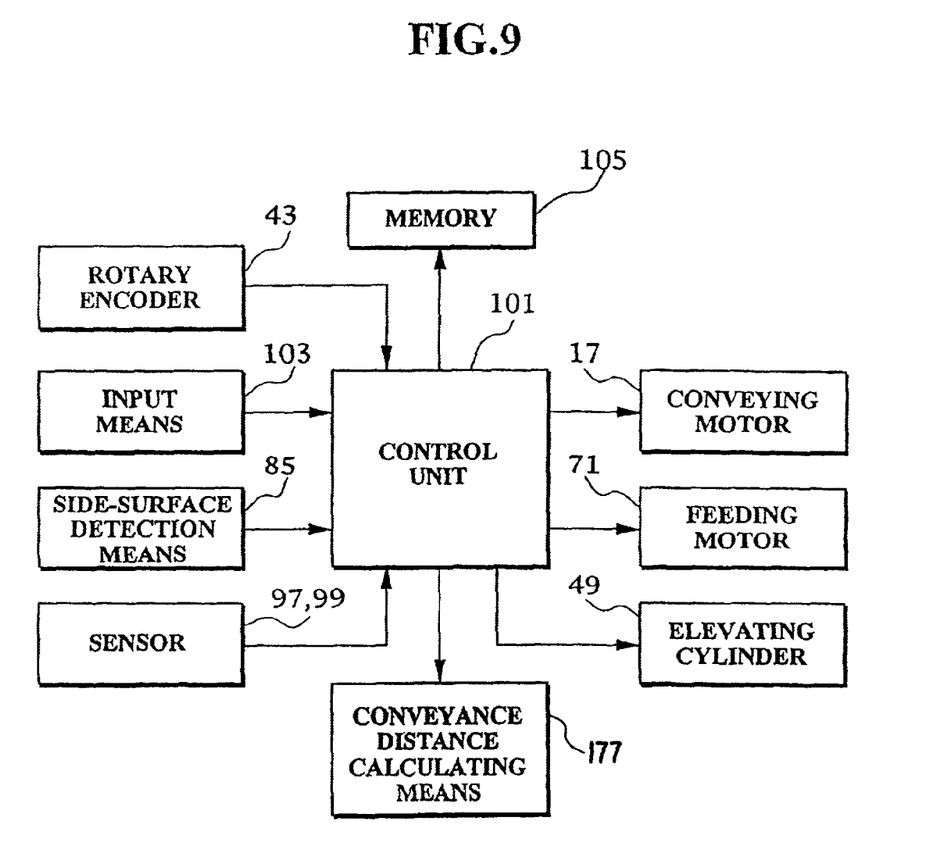
FIG. 9 is a block diagram schematically showing the structure of a control unit.

Referring to FIG. 9, a control unit 101 is provided for controlling the various actuators including the feeding motor 71 and the elevation cylinder 49 of the workpiece conveying and feeding unit 3 and the conveying motor 17 of the workpiece conveying unit 5. An input means 103, such as a keyboard, for inputting the placement order of the plural workpieces W to be placed on the conveying chain 23 of the workpiece conveying unit 5 and the diameter of each workpiece W is conveyed to the control unit 101. Moreover, a sensor composed of the side-surface detection means 85, the light emitter 97 and the light receiver 99 and a rotary encoder 43 for detecting the conveyance distance are connected to the control unit 101.

Moreover, the control unit 101 is provided with a memory 105 for storing various data items and a conveyance distance calculating means 177. When the side-surface detection means 85 has detected the side surface of the workpiece W, the conveyance distance calculating means 177 calculates the conveyance distance to locate the detected workpiece W to the workpiece conveying passage in accordance with the placement order of the workpieces W and the diameters of the workpieces W stored in the memory 105 and the offset distance from the workpiece conveying passage to the side-surface detection means 85.

Thus, in a state where the elevation base 45 of the workpiece conveying and feeding unit 3 has been moved downwards and the conveying roller 59 has been moved downwards as compared with the conveying chain 23 of the workpiece conveying unit 5, an arbitrary conveyance apparatus, such as a crane or a forklift, is operated to place the plural workpieces W on the conveying chain 23 in accordance with the machining order.

In the foregoing case, the plural workpieces W are mounted in accordance with the machining order from a right position of the workpiece conveying and feeding unit 3 shown in FIG. 2 adjacent to the workpiece conveying and feeding unit 3. To be adaptable to the diameters of the workpieces W and the diameters of the adjacent workpieces W, the workpieces W are mounted on the large recesses 37 and the small recesses 39 of the chain links 29 and 31 of the conveying chain 23.

After the plural workpieces W have been mounted on the conveying chain 23 as described above or at arbitrary timing (for example, simultaneously with the mounting operation or before the mounting operation), required data is input through the input means 103 to the memory 105, the data being the placement order of the workpieces W, the diameters of the workpieces W, the adjacent conditions of the workpieces W, for example, whether or not the lengthwise-directional side surface of the workpiece W can be detected by the side-surface detection means 85 (for example, a case where adjacent workpieces W are in contact with each other or a case where small diameter workpiece W is placed between large-diameter workpieces W).

Then, the conveying motor 17 is rotated to drive the conveying chain 23 to convey the workpiece W on the conveying chain 23 to a position above the workpiece conveying passage (the conveying roller 59) of the workpiece conveying and feeding unit 3. When the workpiece W is conveyed by driving the conveying chain 23 as described above, the lengthwise-directional side surface of the first workpiece W of the workpieces W placed in the machining order interrupts the light beam LB of the side-surface detection means 85. Thus, the side surface of the workpiece W can be detected.

When the lengthwise-directional side surface of the workpiece W has been detected by the side-surface detection means 85, the diameter of the workpiece W stored in the memory 105 is read. In accordance with the read diameter of the workpiece W and the offset distance (which is zero in this embodiment) of the side-surface detection means 85, the conveyance distance (which is, in this embodiment, the radius of the workpiece W) for locating the workpiece W to a position above the conveying roller 59 is calculated by the conveyance distance calculating means 107.

In accordance with a result of the calculation performed by the conveyance distance calculating means 107, the conveyance distance of the conveying chain 23 is feedback-controlled by the control unit 101. Therefore, the workpiece W, the side surface of which has been detected by the side-surface detection means 85, can be brought to a position above the conveying roller 59.

If the machining order is changed, for example, such that the second workpiece W is machined and the lengthwise-directional side surface of the second workpiece W cannot directly be detected by the side-surface detection means 85 because of the adjacent conditions of the workpieces W are such that the second workpiece W and the first workpiece W are in contact with each other, a calculation is performed, for example, such that the radius of the second workpiece W is added to the diameter of the first workpiece W when the side surface of the first workpiece W has been detected. Thus, the conveyance distance required to bring the second workpiece W to the position above the conveying roller 59 can be calculated.

That is, if the lengthwise-directional side surface of a predetermined workpiece W cannot directly be detected by the side-surface detection means 85 because the adjacent workpieces W are in contact with each other, a countermeasure can easily be taken by considering the adjacent conditions of the workpieces W.

As described above, the workpiece W is brought to the position above the conveying roller 59, and then the elevation cylinder 49 is operated to upwardly move the elevation base 45 to upwardly move the conveying roller 59. Thus, the workpiece W can be supported by the conveying roller 59. Since the workpiece W is supported by the V-shape peripheral groove 75 of the conveying roller 59 in this case, the axis of the workpiece W coincides with a predetermined vertical plane regardless of the diameter of the workpiece W.

As described above, even if the adjacent workpieces W are in contact with each other when the workpieces W are supported by the conveying roller 59, the workpieces W to the right and left of the central workpiece W supported by the conveying roller 59 are supported by the recesses 83 of the workpiece support member 77. Therefore, the right and left workpieces W are placed slightly apart from the central workpiece W.

As described above, the workpiece W is supported by the conveying roller 59, and then the conveying motor 71 is rotated so as to forwardly rotate the conveying roller 59. Thus, the workpiece W is conveyed to the cutting machine 1 so as to be cut by the cutting machine 1.

A residual portion of the workpiece W cut by the cutting machine 1 is returned to the original position by reversely rotating the conveying roller 59 by reversely rotating the conveying motor 71. When the end of the residual portion has passed between the light emitter 97 and the light receiver 99, the light beam LB emitted from light emitter 97 is detected by the light receiver 99 so that passage of the end of the residual portion is detected.

As described above, the conveying motor 71 is rotated reversely for a predetermined time set to, for example, the timer from detection of the light beam LB by the light receiver 99, and then the reverse rotation is interrupted. Thus, the end of the residual portion can be brought to a predetermined position. Then, the elevation cylinder 49 is operated to downwardly move the elevation base 45 so as to downwardly move the conveying roller 59. Thus, the residual portion on the conveying roller 59 is placed to the original position on the conveying chain 23.

Then, the foregoing operation is repeated so that the plural workpieces W placed on the conveying chain 23 are sequentially fed to the cutting machine 1 so as to be sequentially cut.

When the residual portion has been conveyed to the end portion (the left end portion shown in FIG. 2) by the conveying chain 23 and the residual portion has been detected by the sensor consisting of the light emitter 41A and the light receiver 41B, the conveying movement of the conveying chain 23 is interrupted so that safety of the operation is secured.

As can be understood from the description above, this embodiment enables a plurality of workpieces W placed on the conveying chain 23 to be accurately located and conveyed to the conveying roller 59 one by one. Thus, the workpieces W can sequentially be conveyed to the cutting machine 1 so as to be continuously cut. Moreover, the workpieces W can be placed in the connection portions among the chain links 29 and 31 of the conveying chain 23 and those of the chain links 29 and 31. Thus, a large number of workpieces can be placed.

Although the invention has been described in its preferred form with a certain degree of particularity, it is understood that the present disclosure of the preferred form can be changed in the details of construction and in the combination and arrangement of parts without departing from the spirit and the scope of the invention. That is, the foregoing embodiment has the structure such that the diameters of the workpieces W on the conveying chain 23 and the like are stored in the memory 105 by the input means 103. Another input means may be employed which is structured such that the time periods for which the light beam LB of the side-surface detection means 85 is interrupted by each workpiece W are sequentially measured when the workpieces W are placed on the conveying chain 23 to prevent contact, and then the conveying chain 23 is driven at predetermined speed to move all of the workpieces W from one side to another side so that the diameters of the workpieces W are sequentially measured to sequentially store the diameters in the memory 105. Then, all of the workpieces W are returned to the original positions, and then the workpiece W is brought to the position above the conveying roller 59.

Figure 10A:
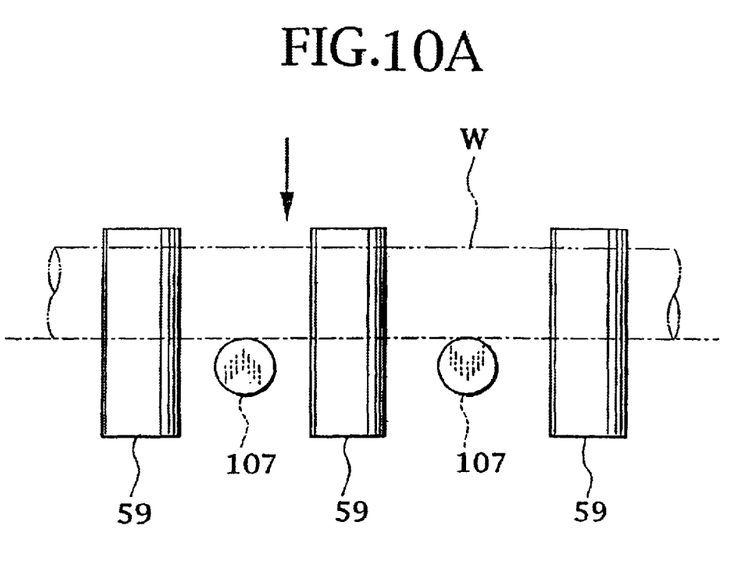
FIGS. 10A and 10B are plan views showing a second embodiment of a side-surface detection means for detecting the lengthwise-directional side surface of a workpiece.
Figure 10B:
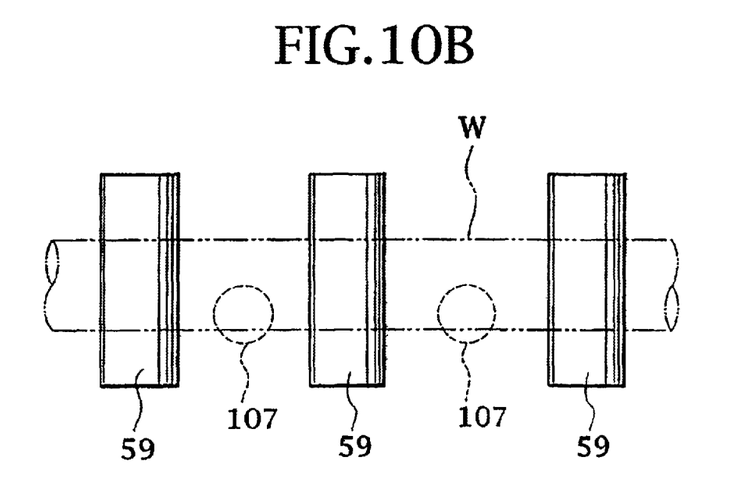
Figure 11:
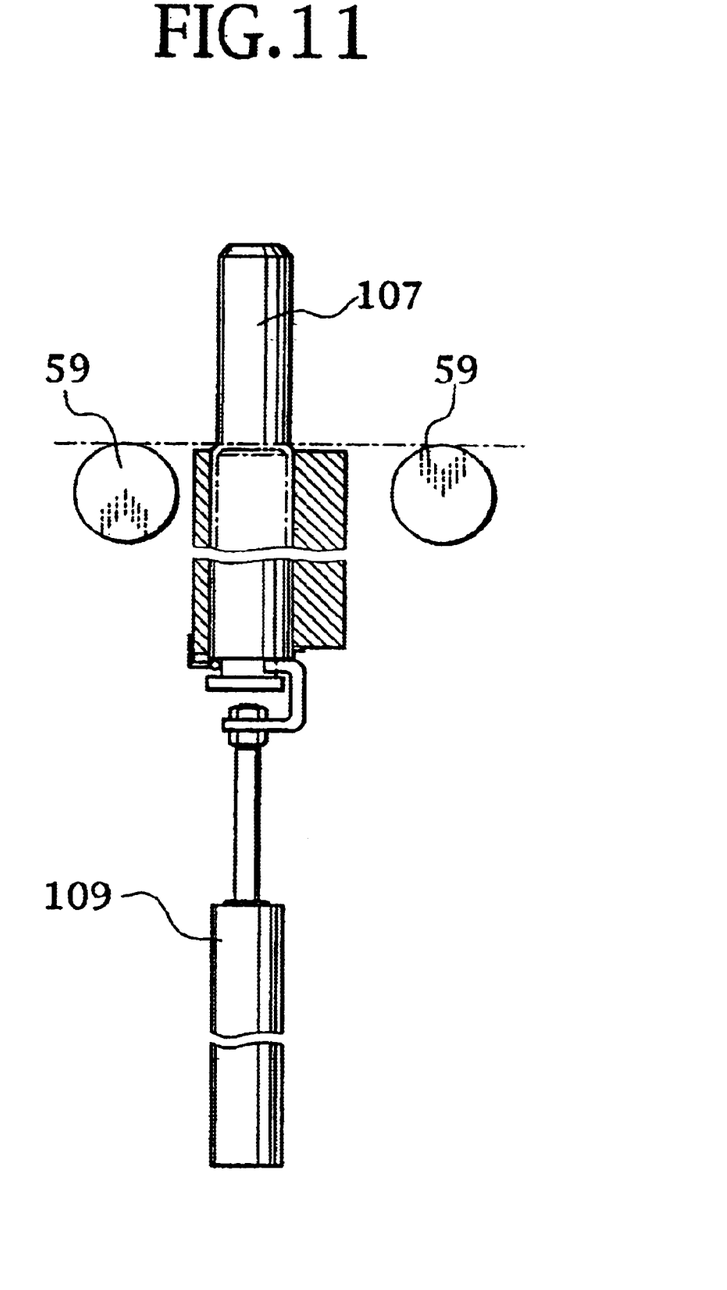
FIG. 11 is a side cross sectional view showing the side-surface detection means for detecting the lengthwise-directional side surface of a workpiece.

The side-surface detection means 85 is, as shown in FIGS. 10 and 11, structured such that a retractable position determining member 107 with respect to the upper portion of the conveying roller 59 is provided. The position determining member 107 is enabled to move vertically by an elevating cylinder 109. When the workpiece W to be conveyed to the position on the conveying roller 59 is brought into contact with the position determining member 107, the position determining member 107 is retracted. Moreover, the workpiece W is conveyed for the distance corresponding to the diameter of the workpiece W such that the foregoing contact position is used as the reference position. Thus, the axis of the workpiece W can accurately be positioned with respect to the predetermined position of the conveying roller 59.

Figure 12:
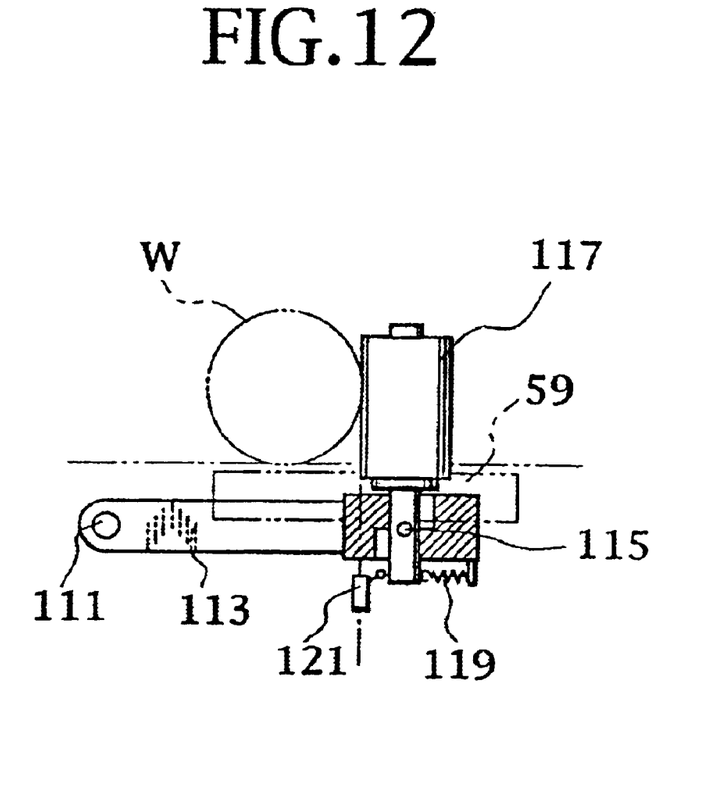
FIG. 12 is a side cross sectional view showing the side-surface detection means for detecting the lengthwise-directional side surface of a workpiece according to the second embodiment of the present invention.

As shown in FIG. 12, a position determining member 117 is provided for the leading end of an arm 113 which is capable of vertically swinging relative to a pin 111 such that the position determining member 117 is enabled to swing. Moreover, a spring 119 is employed to vertically urge the position determining member 117 to rotate about a second pin 115. Furthermore, a detector 121 such as a limit switch for detecting contact of the workpiece W to be brought to the position above the conveying roller 59 with the position determining member 117 is provided.

A structure may be employed in which the workpiece W is conveyed for the distance corresponding to the diameter of the workpiece W such that the position of the workpiece W when the detector 121 has detected the contact of the workpiece W with the position determining member 117 is used as the reference position. Moreover, when the detector 121 has detected the contact, an arbitrary actuator (not shown) is operated to rotate the arm 113 so as to cause the position determining member 117 to retract under the conveying roller 59.

That is, the structure of the side-surface detection means for detecting the lengthwise-directional side surface of the workpiece W to be brought to the position above the conveying roller may be formed into an arbitrary shape.

While preferred embodiments of the present invention have been described using specific terms, such description is for illustrative purposes, and it is to be understood that changes and variations may be made without departing from the spirits or scope of the following claims.

What is claimed is:

1. A method of feeding a workpiece comprising the steps of:
   (a) conveying an elongate workpiece in a direction perpendicular to a lengthwise direction of the workpiece by a workpiece conveying unit so as to convey the workpiece toward a workpiece feeding unit having a workpiece conveying passage therein;
   (b) detecting by a side-surface detection means a side surface of the workpiece being conveyed toward the workpiece conveying passage by the workpiece conveying unit;
   (c) determining a diameter of the workpiece and an offset distance between the workpiece conveying passage and a position where the side surface detection means is disposed, and calculating a distance between the workpiece conveying passage and a position where a center of the workpiece is located when the side surface of the workpiece is detected by the side-surface detection means, in accordance with the diameter of the workpiece and the an offset distance between the workpiece conveying passage and a position where the side-surface detection means is disposed;
   (d) further conveying the workpiece toward the workpiece conveying passage in accordance with the distance calculated in step (c), until the center of the workpiece is vertically aligned with the workpiece conveying passage;
   (e) causing relative vertical movement between the workpiece feeding unit and the workpiece conveying unit so as to convey the workpiece placed on the workpiece conveying unit onto the workpiece conveying passage of said workpiece feeding unit; and
   (f) feeding the workpiece in the lengthwise direction to a cutting machine by the workpiece feeding unit,
   wherein the offset distance between the workpiece conveying passage and the side surface detection means is zero.

2. The method according to claim 1, further comprising the steps of:
   inputting the diameter of the workpiece to be conveyed in a memory before step (a); and
   reading the diameter of the workpiece which is previously stored in the memory before step (c).

3. The method according to claim 2, wherein the side-surface detection means has an upper optical element and a lower optical element which are diagonally disposed opposite to each other on a vertical plane; and
   the lower optical element is disposed on a bottom surface of a bracket which is inclined to vertical such that the bracket protects the lower optical element.

4. A method of feeding a workpiece comprising the steps of:
   (a) conveying an elongate workpiece in a direction perpendicular to a lengthwise direction of the workpiece by a workpiece conveying unit so as to convey the workpiece toward a workpiece feeding unit having a workpiece conveying passage therein;
   (b) detecting by a side-surface detection means a side surface of the workpiece being conveyed toward the workpiece conveying passage by the workpiece conveying unit;
   (c) calculating a distance between the workpiece conveying passage and a position where a center of the workpiece is located when the side surface of the workpiece is detected by the side-surface detection means, in accordance with a diameter of the workpiece and an offset distance between the workpiece conveying passage and a position where the side-surface detection means is disposed;
   (d) further conveying the workpiece toward the workpiece conveying passage in accordance with the distance calculated in step (c), until the center of the workpiece is located right above the workpiece conveying passage;
   (e) causing relative vertical movement between the workpiece feeding unit and the workpiece conveying unit so as to convey the workpiece placed on the workpiece conveying unit onto the workpiece conveying passage of said workpiece feeding unit;
   (f) feeding the workpiece in the lengthwise direction to a cutting machine by the workpiece feeding unit; and
   (g) inputting the diameter of the workpiece to be conveyed in a memory before step (a); and reading the diameter of the workpiece which is previously stored in the memory before step (c); and wherein
   the side-surface detection means emits and receives a light beam which is inclined to vertical; and the side-surface detection means is mounted to an underside of a bracket which is inclined to the vertical such that the bracket protects at least a portion of the side-surface detection means.

* * * * *